G. ORBIN.
NUT LOCK.
APPLICATION FILED FEB. 24, 1912.
1,049,138.
Patented Dec. 31, 1912.
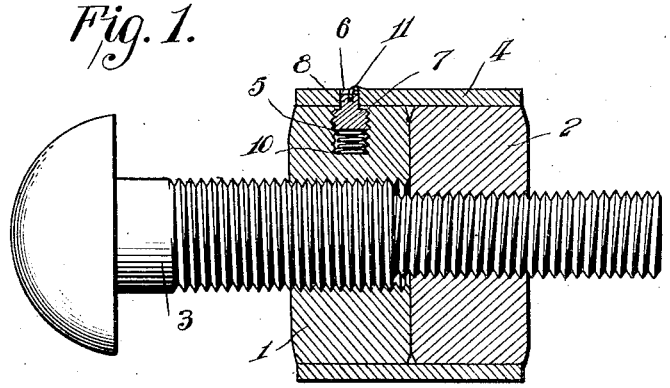
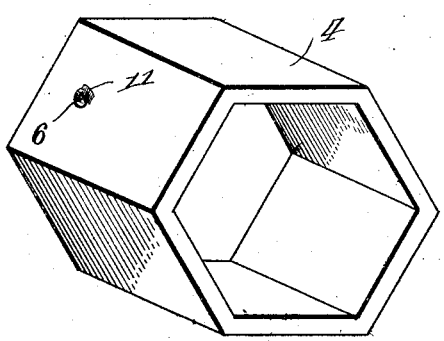
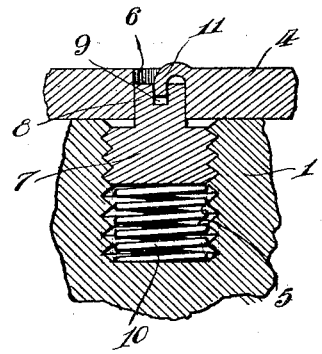
Inventor
George Orbin,
Witnesses
Carroll Bailey
John J. McCarthy
By Victor J. Evans
Attorney

UNITED STATES PATENT OFFICE.

GEORGE ORBIN, OF MILWAUKEE, WISCONSIN.

NUT-LOCK.

1,049,138.	Specification of Letters Patent.	Patented Dec. 31, 1912.

Application filed February 24, 1912. Serial No. 679,679.

*To all whom it may concern:*

Be it known that I, GEORGE ORBIN, a citizen of the United States of America, residing at Milwaukee, in the county of Milwaukee and State of Wisconsin, have invented new and useful Improvements in Nut-Locks, of which the following is a specification.

My present invention relates to improvements in nut locks and has particular application to nut locks of that type employing a plurality of nuts designed to threadedly engage the shank of a bolt in relatively reverse directions and a locking sleeve for the nuts.

In carrying out this invention, it is my purpose to provide a nut lock of the class above set forth wherein the locking sleeve may substantially inclose the nuts and be securely locked thereto against accidental displacement.

With the above and other objects in view and others of a similar nature, the invention consists in the construction, combination and arrangement of parts hereinafter set forth in and falling within the scope of the appended claim.

In the accompanying drawing; Figure 1 is an axial sectional view of a nut lock constructed in accordance with the present invention. Fig. 2 is an enlarged fragmentary section illustrating the means for locking the sleeve to the nuts. Fig. 3 is a detail perspective view of the sleeve.

Similar reference characters designate like parts throughout the several views.

Referring now to the accompanying drawing, in detail, my improved nut lock, as shown, includes a pair of nuts 1 and 2, the bore of the former being of a diameter greater than that of the latter and formed with a right hand thread, while the nut 2 is provided with a left hand thread. 3 designates the bolt designed to receive the said nuts.

In accordance with the present invention and as an essential part thereof, the shank of the bolt at an appropriate distance from the head, is formed with a right hand thread designed to accommodate the threads of the nut 1 and of a diameter similar to that of the nut 1, while the remaining portion of the shank, that is the portion beyond the right hand threaded portion with respect to the head is of a reduced diameter and formed with left hand threads adapted to receive the nut 2, whereby the nut 2 may be applied to the bolt subsequent to the application of the nut 1 thereto, after which the nut 1 may be turned in a reverse direction to bind against the nut 2 to produce a locking action.

In order to lock the nuts 1 and 2 upon the shank of the bolt irrespective of the binding action between such nuts, I make use of a sleeve 4 of a shape corresponding to that of the nuts 1 and 2 and of a length equal to the combined lengths of said nuts so as to substantially inclose the latter, thus locking the nuts upon the bolt against turning movement. One of the nuts, the nut 1 in this instance, is formed with a lateral aperture 5 and alining with this aperture is a relatively small aperture 6 formed in the sleeve 4. A set screw 7 is threadedly engaged in the aperture 5 previous to the application of the locking sleeve to the nuts and as illustrated is equipped with a relatively small head 8 designed to engage the aperture 6 in the sleeve after the said apertures have been brought into alinement, the head 8 being formed with a slot 9 designed to facilitate the movement of the set screw and for another purpose which will be presently described.

Interposed between the lower end and side of the aperture 5 and the set screw 7 is a helical expansion spring 10 designed to exert its tension upon the set screw so as to obviate accidental inward movement thereof, and to doubly secure or hold the set screw against accidental movement, a portion of the wall of the aperture 6 in the sleeve, is upset, as at 11, and driven into the slot 9 of the head of the set screw thereby eliminating displacement or accidental movement of the parts after the nut lock has been applied.

From the foregoing description taken in connection with the accompanying drawing, the construction and manner of employing my invention will be readily apparent. To lock the nuts against accidental movement, the adjacent faces thereof are brought into contact, and the set screw 7 is disposed within the aperture 5 so that the outer end of the head 8 thereof lies flush with the adjacent side of the nut. The sleeve 4 is now slid on the nuts and the aperture 6 therein alined coaxially with the aperture 5 in the respective nut. In this position of the parts, the set screw is worked outwardly of the aperture 5 so that the head 8 thereon is disposed within the aperture 6 within the sleeve, thereby holding the parts against accidental disconnection, the spring 10 acting to hold the screw 7 against accidental movement.

I claim:

A nut lock comprising a pair of nuts having relatively reverse threads adapted to embrace a bolt, a locking sleeve adapted to substantially inclose said nuts, one of said nuts being provided with a large aperture, while the sleeve is formed with a relatively small aperture alining with the aperture in the nut, a set screw threadedly engaging the larger of the apertures and provided with a small head adapted to be disposed in the aperture in the sleeve, a spring interposed between one end of the larger aperture in the nut and said set screw therein and acting to hold the set screw against accidental inward movement, and means for assisting the spring to hold the set screw against movement.

In testimony whereof I affix my signature in presence of two witnesses.

GEORGE ORBIN.

Witnesses:
HERMAN LOUIS FREDERICK,
ELLA MOSSBURG.